US005348695A

United States Patent [19]

Ploumen et al.

[11] Patent Number: 5,348,695

[45] Date of Patent: Sep. 20, 1994

[54] PROCESS FOR THE PREPARATION OF SALT GRANULATES

[75] Inventors: Jan J. H. Ploumen, Roermond, Netherlands; Christiane Thomas, Hürtgenwald, Fed. Rep. of Germany

[73] Assignee: Akzo Nobel N.V., Netherlands

[21] Appl. No.: 974,050

[22] Filed: Nov. 10, 1992

[30] Foreign Application Priority Data

Nov. 11, 1991 [EP] European Pat. Off. ........ 91202921.2

[51] Int. Cl.[5] ........ B29C 67/20

[52] U.S. Cl. ........ 264/42; 264/117; 264/122

[58] Field of Search ........ 264/109, 117, 123, 42, 264/122

[56] References Cited

U.S. PATENT DOCUMENTS

| | | | |
|---|---|---|---|
| 4,001,381 | 1/1977 | Dascalescu et al. | 423/426 |
| 5,164,108 | 11/1992 | Appel et al. | 252/174 |
| 5,198,145 | 3/1993 | Lobunez et al. | 252/174.14 |
| 5,211,869 | 5/1993 | Steinhauser et al. | 252/70 |

FOREIGN PATENT DOCUMENTS

| | | |
|---|---|---|
| 779149 | 2/1972 | Belgium . |
| 221776 | 5/1987 | European Pat. Off. . |
| 925773 | 3/1955 | Fed. Rep. of Germany . |
| 2642035 | 3/1978 | Fed. Rep. of Germany . |
| 3814274 | 6/1990 | Fed. Rep. of Germany . |
| 2224407 | 10/1974 | France . |
| 2019297 | 10/1979 | United Kingdom . |

OTHER PUBLICATIONS

European Search Report.

*Primary Examiner*—Allan R. Kuhns
*Attorney, Agent, or Firm*—Ralph J. Mancini; Louis A. Morris

[57] ABSTRACT

A process for the preparation of salt granulates particularly useful as carrier media for liquid washing agent raw materials in detergent compositions of high bulk density. The process includes granulation under pressure of salt powder having a content of water of crystallization of at least 10% and an average particle size of 1 to 500 μm, and subsequent extraction of the water of crystallization in a fluidized bed at a temperature of the bed which is below the melting point of the granulate. In the granulation process use is preferably made of a mixture of water of crystallization-holding salts and anhydrous salts.

12 Claims, No Drawings

PROCESS FOR THE PREPARATION OF SALT GRANULATES

FIELD OF THE INVENTION

The invention relates to salts in the form of porous granulates, the preparation thereof, and the use thereof as carrier media for active substances, e.g. liquid washing agent raw materials, such as are put to use in detergent compositions, e.g. in washing agents, but above all in detergent compositions with a high bulk density.

BACKGROUND OF THE INVENTION

The preparation of salts in the form of porous particles as well as the use thereof as carrier media for detergents has, in itself, been known for a long time. Thus, in EP-OS 221 776 a process is described which comprises drying an aqueous slurry of sodium carbonate together with detergents to form a powder. This process additionally requires the use of crystal builders. Used as crystal builders are polymeric substances, such as polyacrylates, the molecular weight of which can extend up to the order of 250,000. During drying, which preferably takes place according to the spray-drying process, powders are formed which have a comparatively wide particle size distribution spectrum. The opportunity for influencing the granule size is very limited; it is virtually impossible to prepare particles having a size in excess of 300 μm in this manner. Particles of varying particle size will absorb active substances varyingly, so that particles of varying density are formed. In handling, such as transporting or packing, this can lead to separation of mixtures, resulting in inhomogeneities and, e.g., layers of varying concentration within a single package or a concentration which varies from package to package.

In DE-OS 2 642 035 a process is disclosed which comprises blowing silicate having water of crystallization and a stabilizer by evaporating off the water of crystallization. In this way a product is formed with a low bulk density and particles of greatly varying particle size and a very wide pore spectrum with, in part, very large pores not suited to taking up detergents, since these will ooze out again very easily. As during the swelling process the product is very sticky, there must be a layer of stabilizer on the carrier, to prevent sticking. The processing temperatures are relatively high. Also these granulates have a tendency to cause separation of mixture.

In GB Patent Application 2,019,297 the preparation of granulates, more particularly alkali silicate and/or alkali phosphate-containing granulates is described, in which process a mixture of water-containing or water-releasing material is heated in a granulating apparatus to a temperature below its melting point. As the Examples prove, in this process the water content of the material is only reduced by the order of 10%. Also, the granulates have a very wide particle size distribution, so that sieving is recommended and larger granulates have to be fed to a milling process.

Finally, in DE-PS 3 814 274 the preparation of active sodium carbonate which is more or less pulverulent is described. The particles having a granule size of 0.25 to 0.33 mm serve to remove sulphur dioxide from waste gases. To activate the sodium carbonate the water of crystallization is gradually extracted from it, which drying process may be carried out in a fluidized bed. According to the teachings of this patent, porous granulates, which are especially suited to taking up detergents, are not obtained.

Although a whole series of processes for the preparation of porous salt granulates is already known, there is still a need for improved processes by means of which it is possible to prepare such granulates having good or improved properties. It is the object of the invention to provide a process for the preparation of salts in the form of porous granulates that works economically, is easy to be carried out, has no dust formation or only very little, leads to granulates which are homogeneous, show no tendency to separate in either the loaded or the unloaded state, and which are, above all, utilizable as carrier media for liquid washing powder raw materials in detergent compositions of high bulk density. There objectives are attained by the process for the preparation of solid, porous, water-soluble salt granulates according to the present invention.

SUMMARY OF THE INVENTION

The present invention generally relates to a process for the preparation of solid, porous water-soluble salt granulates, which comprises granulating under pressure, powder or powder mixtures of salts having a content of water of crystallization of at least 10% and an average particle size of 1 to 500 μm to form granulates having an average granule size of 0.300 to 3 mm, and thereafter, wholly or partially extracting the water of crystallization from the granulate in a fluidized bed wherein the temperature of the bed is maintained below the melting point of the granulate.

DETAILED DESCRIPTION OF THE INVENTION

The present invention is directed to a process for the preparation of porous salt granulates which are homogeneous and can be usefully employed as a carrier media for liquid washing powder raw materials in detergent compositions of high bulk density. More particularly, the invention relates to a process for the preparation of solid, porous water-soluble salt granulates, which comprises processing under pressure powder or powder mixtures of salts having a content of water of crystallization of at least 10% and an average particle size of 1 to 500 μm to form granulates having an average granule size of 0.300 to 3 mm, and thereafter, wholly or partially extracting the water of crystallization from the granulate in a fluidized bed wherein the temperature of the bed is maintained below the melting point of the granulate.

Preferably the content of water of crystallization is at least 30%. It is preferred that pulverulent salts holding water of crystallization and having an average particle size of 1 to 500 μm and anhydrous pulverulent salts having an average particle size of 1 to 500 μm are intimately admixed and processed under pressure to form granulates with an average granule size of 0.300 to 3 mm, and that the water of crystallization is then extracted wholly or in part from the granulates in a fluidized bed at a temperature of the bed which is below the melting point of the granulate. Preferably, the anhydrous salt used is sodium carbonate. Particularly suitable as water of hydration-holding salt is sodium carbonate monohydrate or sodium carbonate decahydrate, also sodium sulphate decahydrate. For the granulation process use is made with advantage of a compacting granulator; a high-shear mixer is also highly suitable.

In a preferred embodiment of the invention the mixtures of salts are mixtures of technical salts and/or raw material salts.

The granulates prepared according to the invention are especially suitable for use as carrier media for liquid washing agent raw materials in detergent compositions, more particularly in those which have a bulk density of 700 to 1100 kg/m$^3$, preferably 900 to 1000 kg/m$^3$.

According to the invention there may be processed conventional salts, pure salts, technical salts coming from industrial processes, raw material salts, more particularly soda, sodium sulphate, trona salt ($Na_2CO_3$.-$NaHCO_3$.$2H_2O$), and so on, but also corresponding borates, perborates, nitrates, phosphates, and the like.

For granulation under pressure the usual processes in which pressure granulators are employed may serve. As pressure granulators within the meaning of the invention may be counted compact granulators as they have been described, int. al., in Chapter 5 of C. E. Capes's *Particle Size Enlargement*, Elsevier Scientific Publ. Company, Amsterdam, 1980. Also to be numbered among these are high-shear mixers, as are mentioned, int. al., in European Patent Specification 0 376 360 on p. 3, line 55 to p. 4, line 19. By liquid washing agent raw materials are meant conventional detergents, substances with surface active properties, additives, but also surface inactive materials, such as perfumes, and the like.

The invention will be further illustrated with reference to the following nonlimiting examples.

EXAMPLE 1

$Na_2SO_4$.1$OH_2O$, i.e. sodium sulphate manufactured by Riedel de Haen, No. 13571, was sized through a 1 mm screen. 1.7 kg of the sized material was granulated on a type WP 50 N/75 roller press ex Alexanderwerk and pulverized with a crusher. A screen size of 1.25 mm was selected. The pulverized material was next sized at 0.22 mm. The yield of granulate having a granule size in the range of 0.2 to 1.25 mm was 86%.

Samples of granulated product and of non-granulated but sized product were dehydrated in a Büchi 710 fluidized bed dryer. The treatment data and the properties of the obtained products are compiled in Table 1.

TABLE 1

| Material | Glauper salt 0.20–1.2 mm | |
|---|---|---|
| Treatment | granulated | not granulated |
| dry air temperature °C. | 65 | 65 |
| throughput m$^3$/h | 38 | 38 |
| product input | | |
| matter g | 150 | 200 |
| volume ml | 200 | 260 |
| fluidised bed temp. °C. | 31 | 29 |
| drying time min. | 20 | 25 |
| exhaust air, relative humidity % | 42 | 45 |
| throughput | * | |
| matter g | 68 | 86 |
| volume ml | 160 | 190 |
| porosity ml/kg | 600 | 500 |

*the product was virtually anhydrous

EXAMPLES 2 AND 3

In a ratio of 80 to 20 parts soda $Na_2CO_3$.1$OH_2O$ and anhydrous sodium carbonate was intimately admixed in a 2 l Nauta mixer, granulated on an Alexanderwerk type WP 50 N/75 roller press compacting granulator at a roller pressure of 80 bar, pulverized with a crusher set at 1.6 mm, and sized at ≧0.4 mm. The proportion of granulate having a particle size of greater than 0.4 mm was 85%. After a treatment in the same fluidized bed dryer as in Example 1 a product of high porosity and absorptive capacity was obtained.

Further details can be taken from Table 2.

TABLE 2

| Example | 2 | 3 |
|---|---|---|
| dry air temperature °C. | 65 | 85 |
| throughput m$^3$/h | 38 | 38 |
| product input | | |
| matter g | 200 | 200 |
| volume ml | 260 | 270 |
| fluidised bed temp. °C. | 27 | 29 |
| drying time min. | 26 | 18 |
| exhaust air relative humidity % | 40 | 55 |
| throughput | | |
| matter g | 97,5 | 92,3 |
| volume ml | 260 | 270 |
| porosity ml/kg | 545 | 530 |

EXAMPLES 4 AND 5

Trona and $NaHCO_3$ as Precursors

Sodium carbonate granules along the lines of examples 2 and 3 were prepared from TRONA (sodium sesquicarbonate $Na_2CO_3$.$NaHCO_3$.$2H_2O$ and from $NaHCO_3$. The temperature of the dry air was increased to 115° C. Further details can be taken from table 3.

TABLE 3

| Example | 4 | 5 |
|---|---|---|
| Precursor | Trona | $NaHCO_3$ |
| Supplier | Solvay | M & W |
| Loss on ignition % | 30 | 39 |
| Dewatering | | |
| t dry air °C. | 115 | 115 |
| time min | 60 | 60 |
| Granules | | |
| bulk density kg/m$^3$ | 700 | 700 |
| porosity ml/kg | 325 | 340 |

The porosity in the granules is not only caused by the release of $H_2O$ as in the examples 1–3, but also improved by the release of $H_2O$ and $CO_2$.

EXAMPLE 6 AND 7

Sodium Carbonate Granules from Solvay Process Streams

The novel process is also of great value when the filtercake of $NaHCO_3$, being an intermediate in the Solvay process, is used. A cake from a production plant with composition: $NaHCO_3$=77%, $Na_2CO_3$=6%, $H_2O$=15% and $NH_4HCO_3$=2%, is used.

The filtercake has to be converted into a dry powder when compaction granulation is applied and into a crumbly powder when high shear mixer granulation is applied as the process of particle size enlargement. Such a powder of reduced free water moisture content could be obtained via a drying step, but the admixing with a calcined soda ash is preferred. The following compositions with minimum level of dry $Na_2CO_3$ were determined:

| Consistency* | $NaHCO_3$ filtercake | $Na_2CO_3$ |
|---|---|---|
| Crumbly | 80 | 20 |

-continued

| Consistency* | $NaHCO_3$ filtercake | $Na_2CO_3$ |
|---|---|---|
| dry | 70 | 30 |

*a standard mixing time of 15 min was applied.

Two batches of about 2 kg were prepared by mixing in the Lödige 5 l plough share mixer during 15 min. The resulting powdery mixtures were compaction granulated as described in the other examples. Details on composition drying conditions and product properties are given in table 4.

TABLE 4

| | | |
|---|---|---|
| Compsition | | |
| $NaHCO_3$, filtercake | 67 | 50 |
| $Na_2CO_3$, light | 33 | 50 |
| Granulation Alexanderwerk, pressure in bar | 80 | 80 |
| Screening | | |
| Top screen mm | 1.6 | 1.6 |
| Bottom screen mm | 0.2 | 0.2 |
| Fluid bed drying | | |
| Temperature °C. | 115 | 115 |
| Time min | 50 | 60 |
| Product properties | | |
| Bulk density kg/m$^3$ | 630 | 830 |
| Porosity ml/kg | 410 | 240 |

EXAMPLE 8 AND 9

Sodium Perborate Monohydrate Granules

Granular perborate monohydrate is subject of two recent patent applications:

| Company | Patent No. | Priority date |
|---|---|---|
| Degussa | DE 39 41 851 | 89-12-19 |
| Peroxid-Chemie | AU 91 82 444 | 90-08-16 |

The applicants apply basically the following process:

first step: dehydration second step: particle size enlargement via compaction granulation.

The sodium perborate tetrahydrate used in examples 8 and 9 is part of: IEC Test Detergent with Perborate, manufactured and packed by Henkel KGaA, July 1987. The compaction granulation went along the lines of previous examples. The dehydrated products are compared in table 5.

TABLE 5

| Example | 8 | 9 |
|---|---|---|
| Feed: type | crystals | granules |
| amount g | 90 | 90 |
| Drying: max temp °C. | 70 | 70 |
| Conditions: air m$^3$/h | 40 | 40 |
| time min | 45 | 45 |
| Bed: max temp °C. | 60 | 60 |
| Product dust in filterbag g | 4 | $<0.5$ |
| Output g | 61 | 65 |
| Active oxygen % | 14.6 | 14.7 |
| Bulk density kg/m$^3$ | 470 | 640 |
| Porosity ml/kg | 420 | 280 |

The key advantage of the novel route is that the safety risk from the dust which is formed by drying is clearly reduced. What is more the granules are appropriate to prepare super compact detergent via the concept of filling pores in a carrier by liquid ingredients. The bulk densities which are expected upon sorption of a liquid with density 1000 kg/m$^3$ is given in the table 6.

TABLE 6

| Comparison of the two carriers | Crystal | Granules |
|---|---|---|
| 1 m$^3$ of carrier kg | 470 | 640 |
| Porosity l | 197 | 179 |
| Liquid adsorbed kg | 197 | 179 |
| Final bulk density kg/m$^3$ | 567 | 819 |

EXAMPLE 10

Porous Granules Based on Particle Size Enlargement by High Shear Mixing $Na_2CO_3$ granules with about 2.5 mol of $H_2O$ were made in the 40 l high shear mixer of Diosna.

The following procedure was found as optimum.

| Time in sec | Action |
|---|---|
| 0 | To fill with 5.0 kg soda ash light |
| 0–10 | To add 2.0 kg of water at speed impeller M 1 and chopper 2 |
| 10–30 | To continue mixing |
| 30–45 | To change speed from M 1 to M 2 |
| 45–50 | To admix 0.5 kg soda ash light |
| 50–60 | To empty the bowl |

The sticky granules were spread onto trays. The granules cooled down and hardened in about one hour.

The granules were screened to obtain the size fraction 0.2–1.6 mm. This fraction was dried in the fluid bed drier at 116° C. and demonstrated the following properties:

Bulk density 700 kg/m$^3$

Porosity 240 ml/kg

EXAMPLE 11–14

Drying with Torbed® Process

Fluidized beds have been used in the industry for many years and the technology to optimize their use has been under constant study throughout that time. It is referred to C. M. van't Land, Industrial drying equipment, selection and application, 1992 Marcel Dekker. The Torbed® process is a recent design (U.S. Pat. No. 4,479,920) not included in the review book.

Particles to be processed are moved into a toroidal way above a circle of supporting vanes upon blowing gas trough the chinks between the vanes.

The Torbed® process is commercialized now by Davy McKee, Stockton-on-Tees, England. We applied the following test conditions:

Type of equipment: T 400

Open surface: 15%

Type of operation: batch

Collection of fines: cyclone

Collection of product dust: grit trap

Generation of drying air: direct fired with gas

The feed for the drier (green granules) were prepared from the Solvay process streams $NaHCO_3$ filtercake and calcined soda ash. The two test compositions of examples 6 and 7 were extended to four. The mixing step got upscaled now to the 50 l plough share mixer, made Drais.

The powder from example 14, having the highest content of $NaHCO_3$ filtercake was crumbly of character with as a consistency borderline processibility in the next compaction granulation step.

Upon mixing $NaHCO_3$ filtercake and $Na_2CO_3$ an exothermic reaction starts. IR analysis showed the formation of sodium sesquicarbonate (=Trona, $Na_2CO_3$.-$NaHCO_3.2H_2O$) while the component having the smallest mol fraction completely disappears in the IR-spectrum.

The survey of the process conditions which we applied is given in table 6.

Most striking is that the drying time is reduced by a factor 10 when using the latest fluidized bed development while the product properties look similar.

Most is more, the temperature recorder indicated that the drying process of the green granules comprising Trona and $NaHCO_3$ is a two step process: The fast step is the most endothermic (0-1 min) followed by slower less endothermic step (1-3 min). This observation makes the installation of a Torbed ® device with more drying circles attractive. The heat economy will increase consequently. The $CO_2$ content of the flue gas will increase, easing the recycle step in the Solvay absorbing tower.

TABLE 6

| Example | | | 11 | 12 | 13 | 14 |
|---|---|---|---|---|---|---|
| Composition | $NaHCO_3$ cake | % | 51 | 59 | 67 | 75 |
| | $Na_2CO_3$ | % | 49 | 41 | 33 | 25 |
| Mixing | Feed | kg | 22 | 19 | 22 | 15 |
| | Feed temp | °C. | 22 | 22 | 22 | 22 |
| | T max | °C. | 46 | 53 | 60 | 56 |
| Compaction | Pressure | bar | 80 | 80 | 80 | 80 |
| tion | Throughput | kg/h | 70 | 71 | 84 | 71 |
| granulation | Yield on .3-1.6 | % mm | 73 | 75 | 82 | 80 |
| Green granules | Bulk Density | kg/m³ | 940 | 920 | 925 | 960 |
| | Loss on ignition | % | 25.4 | 29.1 | 33.1 | 36.5 |
| Drying step | Temp. gas | °C. | 200 | 200 | 200 | 200 |
| | Time | min | 3 | 3 | 3 | 3 |
| Torbed | Input | g | 674 | 636 | 637 | 660 |
| | Output* | g | 283 | 276 | 266 | 241 |
| | Cyclone* | g | 8 | 37 | 10 | 24 |
| Absorbent granules | Bulk Density | kg/m³ | 735 | 685 | 645 | 602 |
| | Porosity | ml/kg | 305 | 345 | 370 | 380 |
| | Loss on ignition | % | 0.6 | 0.5 | 0.5 | 0.6 |

*average of three batches

Uses of Porous Salt Granules

The granules prepared according to the invention are especially suitable for use as carrier media for liquid washing ingredients. The impregnated carriers are specially suitable for blending into detergent compositions with a bulk density of 700 to 1100 kg/m³, preferable 900 to 1000 kg/m³.

By liquid washing ingredients are meant conventional detergents, substances with surface active properties but also surface inactive materials.

Nonlimiting examples of the resulting delivery systems are given:

- perfume granule
- antifoam granule—It was found, for example, that the antifoam liquid of Dow corning, coded B-3332, comprising 95% silicone oil and 5% silica was easily impregnated without any formation of a silica skin at the outer surface.
- enzyme active granule—It was found, for example, that a dispersion of enzymes in liquid nonionics like Elfapur LT 85 ® or liquid polyethylene glycol is easily impregnated into the carriers of this process.
- activator formulation via absorption of liquid or dissolved activator.
- disinfectant granule by combining the sorbentia and a disinfecting cationic active material like Arquad B 80 ®.

Analytical Procedures Employed in the Examples

1. Bulk density: Method DIN 53912
2. Porosity: The total porosity of carriers is based on the sorption of a liquid (2-propanol). The carrier is oversaturated first followed by removal of the surplus of liquid by a centrifugal step. The method is described in detail by Daniel McM and Hottovy T: J. of Coll. and I Sc., 78 Nov. 1980, 31. It was confirmed that liquid nonionic loaded till this porosity value on a carrier will not ooze to carton upon contact.

We claim:

1. A process for the preparation of solid, porous water-soluble salt granulates, which comprises processing under pressure powder or powder mixtures of salts having a content of water of crystallization of at least 10% and an average particle size of 1 to 500 μm to form granulates having an average granule size of 0.300 to 3 mm, and thereafter, wholly or partially extracting the water of crystallization from the granulate in a fluidized bed wherein the temperature of the bed is maintained below the melting point of the granulate.

2. The process according to claim 1, wherein said powder or powder mixture of salts have a content of water of crystallization of at least 30%.

3. The process according to claim 1 wherein pulverulent salts holding water of crystallization and having an average particle size of 1 to 500 μm and pulverulent anhydrous salts having an average particle size of 1 to 500 μm are intimately admixed and processed under pressure to form granulates with an average granule size of 0.300 to 3 mm, and the water of crystallization is extracted wholly or in part from the granulates in a fluidized bed at a temperature of the bed which is below the melting point of the granulate.

4. The process according to claim 3, wherein the anhydrous salt used is sodium carbonate.

5. The process according to claim 3, wherein the water of crystallization-holding salt is sodium carbonate monohydrate or sodium carbonate decahydrate.

6. The process according to claim 3, wherein the water of crystallization-holding salt used is sodium sulphate decahydrate.

7. The process according to claim 3, wherein the water of crystallization-holding salt used is trona salt.

8. The process according to claim 3, wherein the water of crystallization-holding salt is sodium perborate tetrahydrate.

9. The process according to claim 3, wherein for the granulation process use is made of a compacting granulator.

10. The process according to claim 3, wherein for the granulation process use is made of a high-shear mixer.

11. The process according to claim 1, wherein the mixtures of salt are mixtures of technical raw materials.

12. The process of claim 1 wherein the water of crystallization-holding salt is selected from the group consisting of sodium carbonate monohydrate, sodium carbonate decahydrate, sodium sulphate decahydrate, trona salt, sodium perborate tetrahydrate and mixtures thereof.

* * * * *